Aug. 26, 1969  A. E. DAVIES  3,463,238
TURF CUTTER
Filed Dec. 4, 1967

INVENTOR.
ARTHUR E. DAVIES
BY
*W.B.Hanpman*
ATTORNEY 3,463,238
TURF CUTTER
Arthur E. Davies, 4226 Euclid Blvd.,
Youngstown, Ohio 44512
Filed Dec. 4, 1967, Ser. No. 687,530
Int. Cl. A01b 45/04
U.S. Cl. 172—19                              1 Claim

ABSTRACT OF THE DISCLOSURE

A turf cutter having a cylindrical body with a tapered sharpened annular cutting extension and an elongated handle.

---

This invention relates to a turf cutter and more particularly to a tool for removing pieces of sod from a turf as, for example, in a lawn or golf green tee or fairway.

The principal object of the invention is the provision of a practical tool for repair of divots or damaged areas in greens, tees or fairways of a golf course.

A further object of the invention is the provision of a turf cutting tool that will cut a section of sod from a turf and lift the cut section straight up without roughing or enlarging the hole from which it is cut.

A still further object of the invention is the provision of a turf cutting tool that compresses the sod being cut so as to prevent crumbling of the grass or dirt thereof.

A still further object of the invention is the provision of a turf cutting tool that is light in weight, easy to use and which will cut sections of sod of a first diameter and move them into an area of a larger diameter so that they may be easily removed therefrom.

The turf cutting tool disclosed herein is particularly adapted for repairing divots and damaged areas in golf course tees, fairways and greens, public parks and residential lawns. The tool enables a damaged area of turf to be quickly and easily removed and replaced with a piece of sod that matches the removed piece exactly as to size and shape.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
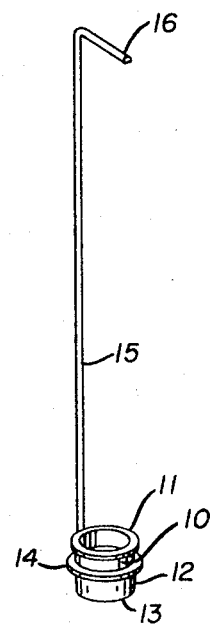
FIGURE 1 is a perspective elevation of the turf cutting tool.
Figures 2, 3:
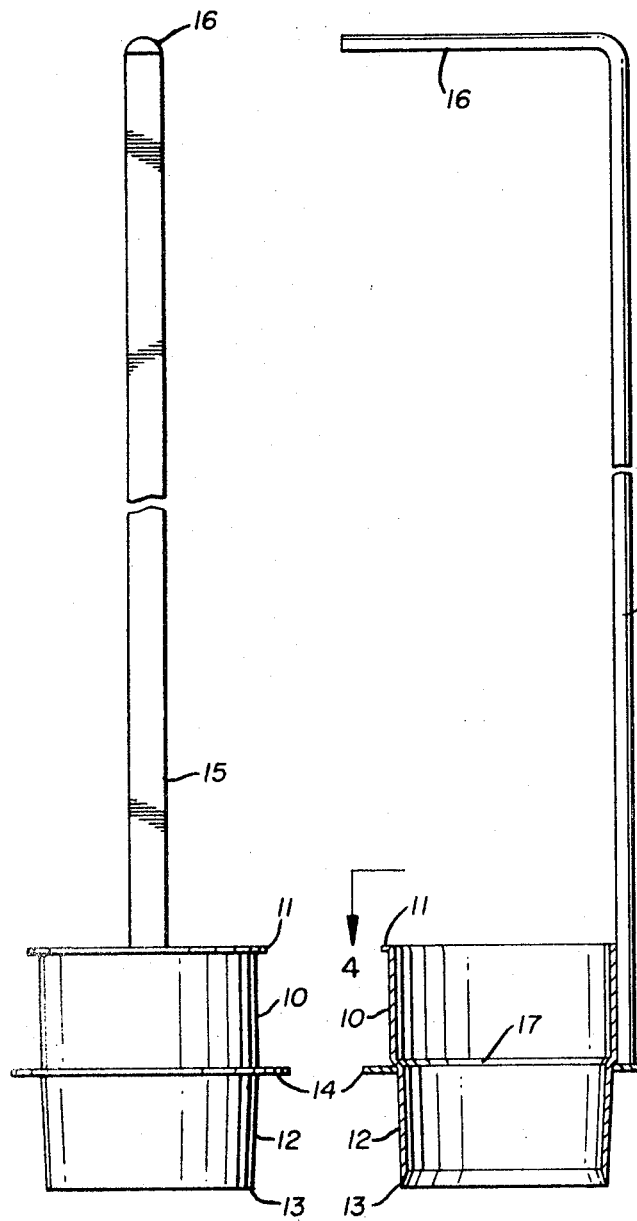
FIGURE 2 is a plan view of the turf cutting tool on an enlarged scale and with parts broken away.
FIGURE 3 is a vertical section of the turf cutting tool seen in FIGURE 2.

By referring to the drawing in FIGURES 1 and 3, in particular, it will be seen that a turf cutting tool has been disclosed which comprises a cylindrical body member 10 having an out-turned annular flange 11 on its upper end and having its lower half tapered inwardly and downwardly, as at 12, with the lower end thereof tapered sharply to form an annular cutting edge 13.

Still referring to the drawing it will be seen that there is a secondary annular flange 14 positioned around the cylindrical body member 10 midway between the flange 11 on its upper end and the cutting edge 13 on its lower end. An elongated handle 15 is secured to the cylindrical body member 10 and extends vertically from the secondary annular flange 14 and terminates in a right angular hand engaging section 16.

Figure 4:
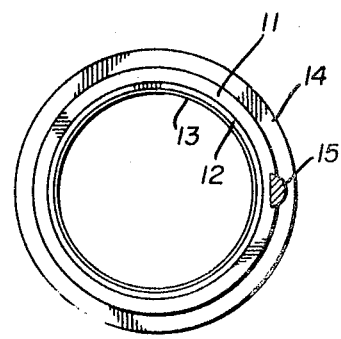
FIGURE 4 is a horizontal section on line 4—4 of FIGURE 3.

By referring now to FIGURES 3 and 4 of the drawing it will be seen that there is an annular shoulder 17 formed inwardly of the cylindrical body member 10 in the central section thereof and joining the upper cylindrical section 10 with the lower inwardly tapered section 12 thereof. The construction thus formed permits the turf cutting tool to be moved downwardly into the turf so as to cut a section of sod therefrom of a diameter comparable with the diameter of the annular cutting edge 13, and which piece of sod will be positioned in the lower tapered section 12 of the turf cutting tool by the cutting action when the tool is moved downwardly into the turf. When a second piece of sod is cut, the first cut piece is moved upwardly thereby into the interior of the upper cylindrical section 10 of the tool where it will be loosely positioned and will fall out when the tool is inverted.

It will be observed that when the pieces of sod are cut by the cutting tool, the secondary annular flange 14 acts as a limiting member with respect to the depth the cutting tool may be pushed into the turf and the overall size and proportion of the cutting tool is such that the piece of sod is completely and accurately cut away from the turf and held in the lower tapered section 12 of the tool, when the same is moved upwardly.

In using the tool, a number of pieces of sod are cut from an area of undamaged turf. The turf cutter is then used to remove damaged sections of turf and the previously cut pieces of undamaged sod are used to replace the same. Since the undamaged pieces of sod are exactly the same size and shape as the damaged pieces of sod removed the repair is practically perfect, and the repair piece of sod requires no additional maintenance as it is complete with roots and dirt throughout its area.

It will be obvious to those skilled in the art that the turf cutting tool is readily positioned on the turf to be cut by the convenient handle and that it is easily moved into the turf in a cutting action by placing the user's foot on the flange 11 of the tool and utilizing the body weight of the user to move the sharpened cutting tool into the turf. The secondary annular flange 14 limits the movement of the annular cutting tool to a predetermined depth, for example, two inches, whereupon the cutting action stops and an upward movement imparted the cutting tool by the handle 15 and hand engaging section 16 easily removes the cut section of sod from the turf.

It will thus be seen that the turf cutting tool disclosed herein meets the several objects of the invention, and having thus described my invention, what I claim is:

1. A turf cutting tool comprising a tubular body member having upper and lower axially aligned portions integrally joined at their respective lower and upper edges, said upper portion being cylindrical and said lower portion being frustoconical and tapered inwardly and downwardly throughout its length and terminating in a sharpened cutting edge, the said junction of said portions inwardly and peripherally offsetting said lower portion and providing an annular shoulder between the two portions, an annular limiting flange rigidly secured to the exterior of said tubular member at the upper end of the lower portion and an elongated handle secured to the cylindrical portion of said tubular member and extending parallel to the longitudinal axis of said tubular member and having a right angular hand holding section thereon, whereby a plug of turf received in said conical portion is in an unwedged condition and when elevated into the cylindrical portion, by the next plug, may be removed by hand.

(References on following page)

References Cited

UNITED STATES PATENTS

| | | | |
|---|---|---|---|
| 536,895 | 4/1895 | Richards | 294—50.7 |
| 1,653,994 | 12/1927 | Emmet | 294—50.7 |
| 1,857,383 | 5/1932 | Johnson | 30—316 |
| 3,273,930 | 9/1966 | Gottfried | 172—22 X |

FOREIGN PATENTS 669,987  8/1929  France.

MYRON C. KRUSE, Primary Examiner

U.S. Cl. X.R.

30—316